(12) United States Patent
Hoffmann et al.

(10) Patent No.: US 8,865,851 B2
(45) Date of Patent: Oct. 21, 2014

(54) MOISTURE-CURING COATING COMPOSITIONS COMPRISING APROTIC SOLVENTS AND BINDERS HAVING ALKOXYSILANE GROUPS AND METHOD OF FORMING A MULTICOAT FINISH THEREWITH

(75) Inventors: Peter Hoffmann, Münster (DE); Benedikt Schnier, Warendorf (DE); Elke Westhoff, Steinfurt (DE); Bernadette Möller, Maria-Veen (DE)

(73) Assignee: BASF Coatings GmbH, Munster (DE)

( * ) Notice: Subject to any disclaimer, the term of this patent is extended or adjusted under 35 U.S.C. 154(b) by 0 days.

(21) Appl. No.: 13/258,211

(22) PCT Filed: Feb. 20, 2010

(86) PCT No.: PCT/EP2010/001070
§ 371 (c)(1),
(2), (4) Date: Sep. 21, 2011

(87) PCT Pub. No.: WO2010/112106
PCT Pub. Date: Oct. 7, 2010

(65) Prior Publication Data
US 2012/0045586 A1   Feb. 23, 2012

(30) Foreign Application Priority Data

Apr. 3, 2009   (DE) .......................... 10 2009 016 195

(51) Int. Cl.
*C09D 143/04*   (2006.01)

(52) U.S. Cl.
CPC .................................... *C09D 143/04* (2013.01)
USPC ............ 528/21; 528/23; 427/407.1; 427/409; 427/412; 427/412.3; 427/419.3

(58) Field of Classification Search
None
See application file for complete search history.

(56) References Cited

U.S. PATENT DOCUMENTS

| | | |
|---|---|---|
| 5,254,619 A | 10/1993 | Ando |
| 5,281,468 A | 1/1994 | Klier et al. |
| 7,871,675 B2 * | 1/2011 | Stanjek et al. ................ 427/387 |
| 2008/0145676 A1 | 6/2008 | Minge et al. |
| 2008/0245999 A1 | 10/2008 | Poppe et al. |

FOREIGN PATENT DOCUMENTS

| | | |
|---|---|---|
| EP | 0008127 A1 | 2/1980 |
| EP | 0159715 A1 | 10/1985 |
| EP | 0159716 A2 | 10/1985 |
| EP | 0249201 A2 | 12/1987 |
| EP | 0263306 A1 | 4/1988 |
| EP | 0276501 A1 | 8/1988 |
| EP | 0400303 A1 | 12/1990 |
| EP | 0489918 A1 | 6/1992 |
| EP | 0497231 A2 | 8/1992 |
| WO | 88/02010 | 3/1988 |
| WO | 94/22968 A1 | 10/1994 |
| WO | 97/12945 A1 | 4/1997 |
| WO | 2004/022618 A1 | 3/2004 |
| WO | 2004/072189 A2 | 8/2004 |
| WO | WO 2004/072189 A2 * | 8/2004 |
| WO | 2007/033786 A1 | 3/2007 |
| WO | 2007/048538 A1 | 5/2007 |

OTHER PUBLICATIONS

International Search Report (English and German) and Written Opinion of the ISA (German), ISA/EP, Rijswijk, NL, mailed May 7, 2010.

* cited by examiner

*Primary Examiner* — William Phillip Fletcher, III
(74) *Attorney, Agent, or Firm* — Quinn Law Group, PLLC

(57) ABSTRACT

Disclosed is a moisture-curing coating composition based on aprotic solvents comprising a binder with a polyacrylate or polymethacrylate obtained using monomer (I)

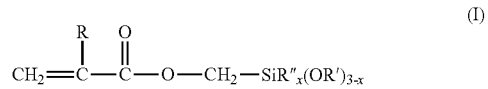

and a phosphorous- and nitrogen-containing catalyst. Also disclosed is a method of producing a multicoat finish using these coating compositions and also to the use of this method to coat interior or exterior bodywork components or to coat components for shipbuilding and aircraft construction or to coat components for household and electrical appliances or to coat plastics moldings or films.

20 Claims, No Drawings

MOISTURE-CURING COATING COMPOSITIONS COMPRISING APROTIC SOLVENTS AND BINDERS HAVING ALKOXYSILANE GROUPS AND METHOD OF FORMING A MULTICOAT FINISH THEREWITH

This application is a 371 U.S. National Stage of International Application No. PCT/EP2010/001070, filed Feb. 20, 2010, which claims the benefit of German Patent Application No. DE102009016195.3, filed Apr. 3, 2009, the disclosures of both of these applications being incorporated herein by reference.

The present invention relates to moisture-curing coating compositions based on aprotic solvents, comprising at least one binder having alkoxysilane groups. The invention additionally provides a method of producing a multicoat finish, more particularly an automotive refinish, and also the multicoat finishes produced by this method.

Coating compositions comprising binders having alkoxysilane groups have been known for a long time. In the presence of atmospheric moisture, the alkoxysilane groups of the binders are capable even at room temperature of undergoing condensation of one another, with elimination of the alkoxy groups, to form Si—O—Si bridges. Coating compositions of this kind are therefore suitable, for example, for producing automotive refinishes. In that context they have the critical advantage over the isocyanate-based coating compositions that are usually used that they are significantly less objectionable from a toxicological standpoint and that it is possible as a result to do largely without the extensive precautionary measures that are necessary with isocyanate-based systems.

EP-B-1 521 790 and WO04/022618 disclose coating compositions which comprise alkoxysilane-functional prepolymers. These alkoxysilane-functional prepolymers are obtainable using what are referred to as alpha-silanes, in which the alkoxysilyl group is attached via a methylene spacer to a functional group. Use is made more particularly of isocyanate-functional alpha-silanes and (meth)acryloyl-functional alpha-silanes. As a result of the use of the alpha-silanes, the alkoxysilyl groups feature a very high moisture reactivity in the presence of catalysts, such as amines. In this way it is possible to provide coating compositions which can be cured even at room temperature to form scratchproof coatings. A disadvantage, however, is that these coating compositions, following addition of the catalysts and following contact with atmospheric moisture, have a high curing rate with only a very short potlife, something which is unacceptable, however, in the context of the use of the coating compositions in the automotive refinish segment.

WO07/048538 discloses α-ethoxysilane-modified polymers which as a polymer radical may comprise a multiplicity of different flexible, long-chain polymers, such as polyester, polyamides, polyethers, polycarbonates, phenolic resins, polyurethanes, vinyl polymers, rubbers, celluloses, silicone resins, acrylate resins or methacrylate resins. The α-ethoxysilane-modified polymers are preferably obtained by reaction of α-ethoxysilanes containing isocyanate groups with polymers containing hydroxyl groups, preferably with hydroxyl-containing polyethers, polyesters, and polyurethanes.

The α-ethoxysilane-modified polymers are used in curable compositions, such as in adhesives, sealants, and coating compositions, for example. In addition to the α-ethoxysilane-modified polymers, these curable compositions may also contain up to 80% by weight of fillers and also reactive diluents, especially polyurethanes having at least one alkoxysilane group, and/or plasticizers. In the course of curing, the curable compositions release little or no methanol. At the same time, in spite of the lower reactivity associated with the substitution of ethoxysilane groups for methoxysilane groups, they feature an acceptable cure time. Disadvantageous features of the coating compositions of WO07/048538, however, are the high flexibility and the low functionality of the silane-functionalized polymers, leading to inadequate performance properties for automotive refinishes.

EP-B-505 469 and EP-A-263 306 disclose transparent coating compositions which comprise alkoxysilane-functional prepolymers, butanol if desired, and, as crosslinking catalysts, p-toluenesulfonic acid, phosphoric acid, tin-based compounds, amines, alkali metal compounds or salts of alkyltitanic acid. The alkoxysilane-functional prepolymers in these compositions are obtainable using gamma-silanes with acrylic unsaturation, in which the alkoxysilyl group is attached via a propyl spacer to an acrylate or methacrylate group. As a result of the propyl spacer, however, the reactivity of the alkoxysilyl groups with respect to atmospheric moisture in the resulting prepolymers, following addition of suitable catalysts, is substantially lower than that of the corresponding polymers with a methyl spacer. In order to achieve effective curing in spite of this, therefore, high quantities of catalyst are needed, but lead to an inadequate potlife and to poor film properties. As a result of the low reactivity, moreover, it is possible to use only di- and trimethoxysilanes, a feature which, however, is very undesirable on account of the associated elimination of methanol on curing.

Furthermore, DE-A-10 2005 000 823 discloses crosslinkable silane-modified copolymers which are obtained by polymerization of ethylenically unsaturated alpha-silanes with other ethylenically unsaturated monomers. These copolymers are used in the form of the aqueous dispersions, for example, in coating compositions of textiles, fibers, wood, and paper, and chemical products for the construction industry, such as fillers, renders, cements, and the like. However, no coating compositions based on aprotic solvents are described. Nor does that specification provide details of suitable crosslinking catalysts and of further additives.

WO2007/033786, moreover, discloses coating compositions which in addition to polymers containing silane groups comprise, as a constituent essential to the invention, phosphonic diesters and diphosphonic diesters as a crosslinking catalyst. The polymers containing silane groups have at least 2, preferably at least 3, condensable silane groups. Preference is given there to using reaction products of isocyanates with aminosilanes. These coating compositions are used in particular in the automotive OEM finishing segment. Preferably, therefore, there is a thermal cure at elevated temperatures of, in particular, 100 to 160° C. for a time of 10 to 60 minutes.

WO04/072189, finally, discloses clearcoat materials which in addition to a polyacrylate resin containing silane groups and a melamine resin comprise blocked or nonblocked phosphoric esters as a crosslinking catalyst for the silane groups. The use of alpha-silanes to prepare the polyacrylate resins containing silane groups, however, is not described, and so these polyacrylate resins have an inadequate reactivity at low curing temperatures. Accordingly, the clearcoat materials described in WO04/072189 are cured at 80 to 150° C. for 10 to 45 minutes and are used to produce OEM clearcoat finishes.

On the basis of the high curing temperatures of the coating compositions known from WO2007/033786 and WO04/072189, however, they are not suitable for the automotive refinish segment.

3

Problem

The problem on which the present invention was based, therefore, was that of providing coating compositions which exhibit rapid curing even at low curing temperatures of not more than 90° C., more particularly of not more than 60° C., in the presence of moisture, i.e., they should be tack-free after curing at 60° C. for just 30 minutes. At the same time the coating compositions ought to have a potlife, at room temperature and in contact with moisture, of at least minutes, preferably of at least 2 hours. This potlife refers to the timespan within which the coating composition shows initial gel particles after it has come into contact with moisture.

Moreover, the coating compositions ought to lead to coatings having a very good overall visual appearance: the resulting coatings, therefore, ought more particularly to be free from surface defects and ought to have a high transparency (i.e., in particular, no haze). Furthermore, the coating compositions ought to have a very low solvent content, and hence a very high solids content.

Lastly, the coating compositions ought to be able to be prepared easily and with very good reproducibility, and not to cause any environmental problems during coating-material application. Preferably, moreover, the coating compositions ought to release very little methanol in the course of their curing.

Solution to the Problem

In light of the above statement of the problem, a moisture-curing coating composition based on aprotic solvents has been found, comprising (A) at least one binder having alkoxysilane groups and (B) at least one crosslinking catalyst, characterized in that said composition comprises as binder (A) at least one polyacrylate and/or polymethacrylate which is obtainable using one or more ethylenically unsaturated monomers (a1) of the formula (I)

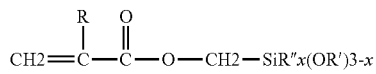
(I)

with
R=hydrogen or methyl radical,
R'=hydrogen, alkyl or cycloalkyl, and
R"=alkyl, cycloalkyl, aryl or aralkyl, it being possible for the carbon chain to be interrupted by nonadjacent oxygen groups, sulfur groups or groups NRa, with Ra=alkyl, cycloalkyl, aryl or aralkyl, and
x=0 to 2,
and
as crosslinking catalyst at least one phosphorous- and nitrogen-containing catalyst (B).

The present invention also provides a method of producing a multicoat finish using these coating compositions, more particularly of producing a refinish, and also to the use of this method to coat interior or exterior bodywork components or to coat components for shipbuilding and aircraft construction or to coat components for household and electrical appliances or to coat plastics moldings or films.

In the light of the prior art it was surprising and unforeseeable for the skilled worker that the problems on which the present invention was based could be solved by means of the coating composition of the invention, based on aprotic solvents.

4

Thus it is surprising in particular that the coating compositions of the invention not only exhibit rapid curing in the presence of moisture—that is, they are tack-free after curing at 60° C. for just 30 minutes—but also, at the same time, have a potlife of at least 30 minutes, preferably of at least 2 hours. As result of the at least proportional use of acrylate- and/or methacrylate-functional alkoxysilanes with ethoxy groups instead of methoxy groups to prepare the binders, moreover, it is possible to provide coating compositions which, on curing, release very little methanol and which, nevertheless, exhibit the requisite rapid curing.

Furthermore, the coating compositions of the invention lead to coatings having a very good overall visual appearance. The resulting coatings are, in particular, free from surface defects and exhibit a high transparency. The coating compositions of the invention, moreover, are distinguished by a higher solids content as compared with coating compositions based on hydroxyl-containing acrylate resins with the same molecular weight.

Lastly, the coating compositions can be prepared easily and with very good reproducibility, and cause no environmental problems during application.

DESCRIPTION OF THE INVENTION

Binder (A) with Alkoxysilane Groups

It is essential to the invention that the coating compositions comprise as binder (A) at least one polyacrylate and/or polymethacrylate which is obtainable using one or more ethylenically unsaturated monomers (a1) of the formula (I)

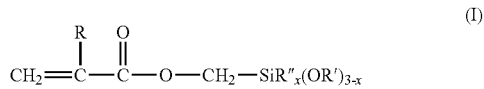
(I)

with
R=hydrogen or methyl radical,
R'=hydrogen, alkyl or cycloalkyl, preferably R'=alkyl radical, in particular having 1 to 4 C atoms, especially R'=ethyl and/or methyl,
R"=alkyl, cycloalkyl, aryl or aralkyl, it being possible for the carbon chain to be interrupted by nonadjacent oxygen groups, sulfur groups or groups NRa, with Ra=alkyl, cycloalkyl, aryl or aralkyl, preferably R"=alkyl radical, in particular having 1 to 6 C atoms,
x=0 to 2, in particular x=0 to 1, with particular preference x=0.

Examples of ethylenically unsaturated monomers of the formula (I) are alpha-methacryloyloxymethylmethoxydimethylsilane, alpha-methacryloxymethyldimethoxymethylsilane, alpha-methacryloyloxymethyltrimethoxysilane, alpha-methacryloyloxymethylethoxydimethylsilane, alpha-methacryloyloxymethyldiethoxymethylsilane, alpha-methacryloyloxymethyltriethoxysilane, alpha-methacryloyloxymethyltriisopropoxysilane, alpha-methacryloyloxymethyldiisopropoxymethylsilane, alpha-methacryloyloxymethylisopropoxydimethylsilane, alpha-methacryloyloxymethyltris(2-methoxyethoxy)silane, alpha-methacryloyloxymethylbis(2-methoxyethoxy)methylsilane, alpha-methacryloxymethyltripropoxysilane alpha-Methacryloxymethyldipropoxymethylsilan, alpha-methacryloyloxymethylpropoxydimethylsilane and alpha-methacryloyloxymethyl(2-methoxyethoxy)dimethylsilan, alpha-acryloyloxymethylmethoxydimethylsilane, alphaacryloyloxymethyldimethoxymethylsilane, alpha-acryloyloxymethyltrimethoxysilane, alpha-acryloyloxymethylethoxydimethylsilane, alpha-acryloyloxymethyldiethoxymethylsilane, alpha-acryloyloxymethyltriethoxysilane, alpha-acryloyloxymethyltriisopropoxysilane, alpha-acryloyloxymethyldiisopropoxymethylsilane, alpha-acryloyloxymethylisopropoxydimethylsilane, alpha-acryloyloxymethyltris(2-methoxyethoxy)silane, alpha-acryloyloxymethyltripropoxysilane, alpha-acryloyloxymethyldipropoxymethylsilane, alpha-acryloyloxymethylbis(2-methoxyethoxy)methylsilane, alpha-acryloyloxymethylpropoxydimethylsilane and alpha-acryloyloxymethyl(2-methoxyethoxy)dimethylsilane. These alpha-silanes may be used individually or else in the form of mixtures of 2 or of more alpha-silanes for preparing the binders having alkoxysilane groups.

It is preferred to use binders containing ethoxysilyl groups. In relation to binders containing methoxysilyl groups, they have the advantage that their curing releases the less toxicologically objectionable ethanol, and not the toxicologically objectionable methanol. Preference is therefore given to coating compositions which comprise as binder at least one polyacrylate and/or polymethacrylate which is obtainable using one or more ethylenically unsaturated monomers of the formula (II)

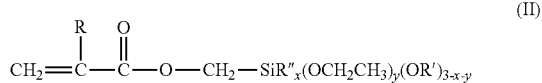
(II)

where R, R', and R" have the definition indicated above and
x=0 to 2, preferably x=0 to 1, and more preferably x=0,
y=1 to 3, preferably y=2 to 3, and
1≤x+y≤3, preferably 2≤x+y≤3.

As ethylenically unsaturated monomers of the formula (II) it is therefore preferred to use alpha-methacryloyloxymethylethoxydimethylsilane, alpha-methacryloyloxymethyldiethoxymethylsilane, alpha-methacryloyloxymethyltriethoxysilane, alpha-acryloyloxymethylethoxydimethylsilane, alpha-acryloxymethyldiethoxymethylsilane and/or alpha-acryloyloxymethyltriethoxysilane. Particular preference is given to using alpha-methacryloylmethyldiethoxymethylsilane, alpha-methacryloyloxymethyltriethoxysilane, alpha-acryloyloxymethyldiethoxymethylsilane and/or alpha-acryloyloxymethyltriethoxysilane.

For the preparation of the binders (A) used in accordance with the invention it is possible where appropriate, together with the unsaturated monomer or monomers (a1) of the formula (I) and/or with the unsaturated monomer or monomers of the formula (II), to employ one or more further ethylenically unsaturated monomers. Further ethylenically unsaturated monomers employed are ethylenically unsaturated monomers that are customarily used, but preferably ethylenically unsaturated monomers without active hydrogen.

Further ethylenically unsaturated monomers employed are ethylenically unsaturated monomers that are customarily used, but preferably ethylenically unsaturated monomers without active hydrogen.

Preference is therefore given to coating compositions in which the binder (A) having alkoxysilane groups is obtainable by polymerization of
(a1) one or more ethylenically unsaturated monomers (a1) of the formula (I) and/or of the formula (II), if desired, one or more alkyl esters of ethylenically unsaturated carboxylic acids (a2) and/or
if desired, one or more vinylaromatic compounds (a3) and/or
if desired, one or more ethylenically unsaturated monomers (a4) having at least two polymerizable, ethylenically unsaturated double bonds and/or
if desired, one or more further ethylenically unsaturated compounds (a5) different from the monomers (a1) to (a4).

Particularly suitable as monomer (a2) are alkyl esters of ethylenically unsaturated carboxylic acids without active hydrogen, more preferably alkyl esters without a further functional group, and very preferably alkyl esters of saturated monoalcohols with ethylenically unsaturated carboxylic acids. Examples of such alkyl esters of ethylenically unsaturated carboxylic acids (a2) are alkyl esters and cycloalkyl esters of acrylic, methacrylic, fumaric, crotonic, and maleic acid, preferably of acrylic and/or methacrylic acid, such as, preferably, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl-acrylates and/or cycloalkyl methacrylates, such as cyclopentyl acrylate, cyclopentyl methacrylate, isobornyl acrylate, isobornyl methacrylate, cyclohexyl acrylate and/or cyclohexyl methacrylate.

Particularly suitable as monomer (a3) are vinylaromatic compounds without active hydrogen. Examples of suitable vinylaromatic compounds (a3) are vinylaromatic hydrocarbons such as vinyltoluene, alpha-methylstyrene or, in particular styrene.

Particularly suitable as monomer (a4) are ethylenically unsaturated compounds having at least two polymerizable, ethylenically unsaturated double bonds without active hydrogen. Examples of suitable ethylenically unsaturated monomers (a4) having at least two polymerizable ethylenically unsaturated double bonds are diesters of saturated dialcohols with ethylenically unsaturated carboxylic acids, especially diesters of saturated dialcohols with acrylic, methacrylic, fumaric, crotonic, and maleic acid, preferably acrylic and/or methacrylic acid, such as, for example, hexanediol diacrylate, hexanediol dimethacrylate, glycol diacrylate, glycol dimethacrylate, butanediol diacrylate, butanediol dimethacrylate, trimethylolpropane triacrylate, and trimethylolpropane trimethacrylate. The monomer (a4) may also, furthermore, be a polycarboxylic acid esterified with an unsaturated alcohol containing a polymerizable double bond. Finally it is also possible as monomer (a4) to use reaction product of a polyisocyanate and of an unsaturated alcohol or of an amine. As an example thereof, mention may be made of the reaction product of one mole of hexamethylene diisocyanate and two moles of allyl alcohol, or the reaction product of isophorone diisocyanate and hydroxyethyl acrylate.

As further ethylenically unsaturated compounds (a5), different from the monomers (a1) to (a4), use is made in particular of silicon-free monomers without active hydrogen, such as, for example, nitriles of acrylic or methacrylic acid, vinyl esters or vinyl ethers. In order to allow more rapid absorption of water on crosslinking under the influence of atmospheric moisture, it may be advantageous to use up to 10% by weight, based on the sum of (a1) to (a5), of an ethylenically unsaturated carboxamide as an additional comonomer (a5) to the ethylenically unsaturated monomers (a1) to (a4). Examples of suitable carboxamides include acrylamide, methylacrylamide itaconamide, α-ethylacrylamide, crotonamide, fumaramide, and maleamide.

Particularly preferred coating compositions are those in which the binder (A) having alkoxysilane groups is obtainable by polymerization of
(a1) 10% to 50%, preferably 15% to 40%, more preferably 20% to 35%, by weight of one or more ethylenically unsaturated monomers (a1) of the formula (I) and/or of the formula (II),
(a2) 15% to 85%, preferably 25% to 60%, by weight of one or more alkyl esters of ethylenically unsaturated carboxylic acids,
(a3) 0% to 50%, preferably 10% to 30%, by weight of one or more vinylaromatic compounds,
(a4) 0% to 20%, preferably 0% to 10%, by weight of one or more ethylenically unsaturated monomers having at least two polymerizable, ethylenically unsaturated double bonds, and
(a5) 0% to 40%, preferably 0% to 20%, by weight of one or more further ethylenically unsaturated compounds different from the monomers (a1) to (a4),
the sum of the weight fractions of the monomers (a1) to (a5) making 100% by weight in each case.

The polyacrylates that are very particularly preferred in accordance with the invention are generally copolymers and preferably have number-average molecular weights Mw of between 1 000 and 20 000 daltons, more particularly between 1 500 and 10 000 daltons, measured in each case by means of gel permeation chromatography (GPC) against a polymethyl methacrylate standard.

The free-radical polymerization for preparing the binders having alkoxysilane groups is carried out customarily in an organic solvent at temperatures of 80-180° C., preferably at 90-160° C. Advantageously the free-radical polymerization for preparing the polymer containing alkoxysilane groups is carried out such as to result in a solution of the polymer with a solids content of 40% to 85% by weight.

Suitable solvents for the free-radical polymerization include nonreactive solvents, such as, for example, esters, such as ethyl acetate, propyl acetate, n-butyl acetate, and isobutyl acetate, ether esters such as methoxypropyl acetate or butylglycol acetate, ketones such as acetone, methyl ethyl ketone, methyl isobutyl ketone or cyclohexanone, ethers, aromatic, aliphatic, araliphatic and/or cycloaliphatic hydrocarbons, and ketones, and also mixtures of said solvents. Preference is given to using n-butyl acetate, isobutyl acetate, solvent naphtha and/or xylene.

The polymerization reaction is performed customarily in the presence of an initiator and, if desired, in the presence of a polymerization regulator without active OH or NH groups, preference being given to using mercaptosilanes as regulators. Examples of suitable regulators are the compounds described in International patent application WO88/02010.

Suitable initiators include azo initiators, such as, for example, azobisisobutyronitrile. Where there is a low or absent fraction of polyethylenically unsaturated monomer (a4) used, peroxy esters in particular are used as initiators. Examples of such that may be mentioned include di-tert-butyl peroxide, di-tert-amyl peroxide, tert-amyl peroxy-2-ethylhexanoate, and tert-butyl peroxy-2-ethylhexanoate. It is of course also possible to use azo initiators with reactive silicone groups, of the kind described in EP-A-159 715 and EP-A-159 716, for example.

The binders (A) having alkoxysilane groups are used in the coating compositions of the invention preferably in an amount of 70.0% to 99.0%, more preferably of 85.0% to 95.0%, by weight, based in each case on the weight of the nonvolatile constituents of the coating composition of the invention. Furthermore, the coating compositions of the invention customarily contain between 20% and 45%, in particular between 30% and 40%, by weight, based in each case on the total weight of the coating composition, of one or more solvents, the amount of solvent being stated without taking account of the reactive diluents.

Catalyst (B)

Use is made as catalyst (B) of phosphorous- and nitrogen-containing catalysts. It is also possible here to use mixtures of two or more different catalysts (B).

Examples of suitable amine-blocked phosphorous-containing catalysts (B) are amine-blocked phosphonic diesters and/or amine-blocked diphosphonic diesters, preferably from the group consisting of amine-blocked acyclic phosphonic diesters, amine-blocked cyclic phosphonic diesters, amine-blocked acyclic diphosphonic diesters, and amine-blocked cyclic diphosphonic diesters and/or amine-blocked phosphoric diesters and/or amine-blocked phosphoric monoesters. Unblocked phosphonic diesters and diphosphonic diesters of these kinds that are suitable for preparing the respective amine-blocked catalysts (B) are described for example in German patent application DE-A-102005045228.

In the coating compositions of the invention it is preferred to use catalysts or mixtures of different catalysts which, where appropriate with addition of corresponding solvents, have sufficient solubility in the coating composition, so that crystallization of the catalyst is prevented.

The amine-blocked phosphorous-containing catalysts (B) are prepared using in particular, however, substituted phosphoric monoesters, phosphoric diesters, and phosphoric triesters, preferably from the group consisting of acyclic phosphoric monoesters, acyclic phosphoric diesters, and acyclic phosphoric diesters, and also acyclic phosphoric triesters. These acyclic phosphoric diesters (B) and acyclic phosphoric triesters are selected in particular from the group consisting of acyclic phosphoric diesters (B) and acyclic phosphoric triesters of the general formula (III):

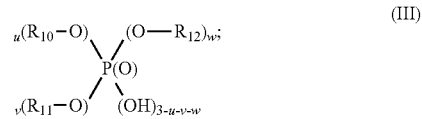

(III)

where
u=0 to 3, v=0 to 3, w=0 to 3, and u+v+w<=3 and
the radicals $R_{10}$, $R_{11}$, and $R_{12}$ are selected from the group consisting of:
substituted and unsubstituted alkyl- having 1 to 20, preferably 2 to 16, and in particular 2 to 10 carbon atoms, cycloalkyl- having 3 to 20, preferably 3 to 16, and in particular 3 to 10 carbon atoms, and aryl- having 5 to 20, preferably 6 to 14, and in particular 6 to 10 carbon atoms,
substituted and unsubstituted alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, in which the alkyl, cycloalkyl, and aryl groups present in each case contain the above-recited number of carbon atoms, and substituted and unsubstituted radical- of the above-recited kind containing at least one, more particularly one, heteroatom selected from the group consisting of oxygen atom, sulfur atom, nitrogen atom, phosphorous atom, and silicon atom, more particularly oxygen atom, sulfur atom, and nitrogen atom, and in addition may also represent hydrogen (partial esterification).

Examples of amine-blocked phosphoric esters suitable as catalyst (B) are amine-blocked tributyl phosphate, amine-block tris(2-ethylhexyl)phosphate, amine-blocked bis(2-ethylhexyl)phosphate, amine-blocked 2-ethylhexyl phosphate, amine-blocked tris(butoxyethyl)phosphate, amine-blocked tris(lauryltriethylene glycol)phosphate, amine-blocked bis(lauryltriethylene glycol)phosphate, amine-blocked mono(lauryltriethylene glycol)phosphate, amine-blocked dihexadecyl phosphate, amine-blocked diisononyl phosphate, amine-blocked monoisodecyl phosphate. and amine-blocked commercial alkyl phosphates, such as amine-blocked Korantin SMK from BASF SE, for example.

As catalyst (B) it is preferred to use amine-blocked phosphoric monoesters and amine-blocked phosphoric diesters, especially amine-blocked $C_2$ to $C_{18}$ alkyl phosphates, such as, for example, amine-blocked dibutyl phosphate, amine-blocked bis(2-ethylhexyl)phosphate, amine-blocked 2-ethylhexyl phosphate, amine-blocked dihexadecyl phosphate, amine-blocked diisononyl phosphate, amine-blocked monoisodecyl phosphate, preferably amine-blocked $C_6$ to $C_{10}$ alkyl phosphates, and also mixtures of two or more of the stated catalysts. Use is made in particular here of amine-blocked monoethylhexyl phosphate, amine-blocked diethylhexyl phosphate, amine-blocked phenyl phosphate, and mixtures of the stated catalysts, with very particular preference amine-blocked bis(2-ethylhexyl)phosphate.

Examples of amines with which the phosphoric esters and/or phosphonic esters are blocked are, in particular, tertiary amines, examples being bicyclic amines, such as diazabicycloctane (DABCO), diazabicyclononene (DBN), diazabicycloundecene (DBU), dimethyldodecylamine or triethylamine, for example. For blocking the phosphorous-containing catalysts it is particularly preferred to use tertiary amines which ensure high activity of the catalyst under the curing conditions of not more than 90° C. and that preferably have a boiling point<100° C. under a pressure of 1013.25 mbar. It is very particularly preferred, therefore, to use triethylamine to block the phosphorous-containing catalysts.

Certain amine-blocked phosphoric acid catalysts are also available commercially (e.g., Nacure products from King Industries). As an example, mention may be made of Nacure 4167 from King Industries as a particularly suitable catalyst based on an amine-blocked phosphoric acid partial ester.

The catalysts are used preferably in fractions of 0.1% to 10.0%, more preferably in fractions of 0.5% to 5.0%, very preferably in fractions of 0.5% to 3.0%, by weight, based in each case on the weight of the nonvolatile constituents of the coating composition of the invention. A lower activity on the part of the catalyst can be partly compensated by means of correspondingly higher quantities used.

Aliphatic Monoalcohol (C)

The coating compositions of the invention preferably further comprise one or more aliphatic monoalcohols (C) which are different from the solvent, since this addition prolongs the potlife of the coating compositions. Examples of suitable monoalcohols (C) are, in particular, aliphatic primary monoalcohols having 2 to 4 carbon atoms, such as ethanol, propanol, and n-butanol for example. It is preferred to use n-propanol and/or n-butanol.

Component (C) is used preferably in an amount of 0% to 20.0%, more particularly in an amount of 0.5% to 10.0%, by weight, based in each case on the weight of the nonvolatile constituents of the coating composition of the invention.

Further Components of the Coating Composition

The coating compositions may if desired further comprise one or more reactive diluents. Examples of suitable reactive diluents are monomeric and/or oligomeric compounds containing silane groups, especially carbamate-functional silanes and/or vinyl-functional silanes. Examples of suitable reactive diluents include N-trimethoxysilylmethyl-O-methylcarbamate and N-dimethoxy(methyl)silylmethyl-O-methylcarbamate, vinyldimethoxymethylsilane, vinyltriethoxysilane, vinyltrimethoxysilane, and vinyltris(2-methoxyethoxy) silane.

The reactive diluents are used preferably in an amount of 0% to 20%, more particularly in an amount of 0.5% to 10.0%, by weight, based in each case on the weight of the nonvolatile constituents of the coating composition of the invention.

The coating compositions contain generally less than 5%, in particular less than 2%, by weight, based in each case on the weight of the nonvolatile constituents of the coating composition of the invention, and with particular preference none at all, of isocyanate. Moreover, the coating compositions of the invention contain generally less than 5%, more particularly less than 2%, by weight, based in each case on the weight of the nonvolatile constituents of the coating composition of the invention, and with particular preference none at all, of amino resin.

Furthermore, the coating composition of the invention may comprise at least one customary and known coatings additive in effective amounts, i.e., in amounts preferably up to 30%, more preferably up to 25%, and in particular up to 20%, by weight, based in each case on the weight of the nonvolatile constituents of the coating composition.

Examples of suitable coatings additives are:

in particular, UV absorbers;

in particular, light stabilizers such as HALS compounds, benzotriazoles or oxalanilides;

free-radical scavengers;

slip additives;

defoamers;

wetting agents such as siloxanes, fluorine compounds, carboxylic acid monoesters, phosphoric esters, polyacrylic acids and their copolymers or polyurethanes;

adhesion promoters such as tricyclodecane-dimethanol;

flow control agents;

film-forming assistants such as cellulose derivatives;

fillers such as, for example, nanoparticles based on silicon dioxide, aluminum oxide or zirconium oxide; for further details refer to Römpp Lexikon "Lacke and Druckfarben", Georg Thieme Verlag, Stuttgart, 1998, pages 250 to 252;

rheology control additives, such as the additives known from patents WO 94/22968, EP-A-0 276 501, EP-A-0 249 201 or WO 97/12945; crosslinked polymeric microparticles, as are disclosed, for example, in EP-A-0 008 127; inorganic phyllosilicates such as aluminum magnesium silicates, sodium magnesium phyllosilicates, and sodium magnesium fluorine lithium phyllosilicates of the montmorillonite type; silicas such as Aerosils; or synthetic polymers having ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;

and/or flame retardants.

In a further embodiment of the invention the coating composition of the invention may further comprise addition of pigments and/or fillers and may serve to produce pigmented topcoats. The pigments and/or fillers employed for this purpose are known to the skilled worker.

The coating compositions of the invention are prepared by customary methods, by processing the binder (A) containing alkoxysilane groups, organic solvent, the aliphatic monoalcohol (C), where used, and also auxiliaries and additives, by mixing and, where appropriate, dispersing, to form a coating material, and admixing the catalyst (B) shortly before use.

Application and Curing of the Coating Compositions and Also Use of the Resulting Coatings The coating compositions of the invention can be applied by all of the customary application methods, such as spraying, knife coating, spreading, dipping, pouring, impregnating, trickling or rolling, for example. In the course of such application, the substrate to be coated may itself be at rest, with the application equipment or unit being moved. Alternatively it is also possible for the substrate to be coated, a coil in particular, to be moved, with the application unit being at rest relative to the substrate or being moved in an appropriate way.

Preference is given to employing spray application methods, such as, for example, compressed air spraying, airless spraying, high-speed rotation, electrostatic spray application (ESTA), pneumatic spray application with a spray gun; pneumatic spray application with a spray gun is particularly preferred.

The curing of coating compositions of the invention has no peculiarities but can instead take place at ambient temperature or at elevated temperatures of up to 200° C. Where the coating compositions are used for automotive refinish or for the coating of plastics parts for surface mounting, curing takes place at ambient temperature or at slightly elevated temperatures of not more than 90° C., in particular of not more than 60° C.

The thermal cure at temperatures of not more than 90° C. can be accomplished with customary and known apparatus, such as heating bands and also heating lamps which emit near and far infrared. The temperatures employed and the duration of the heating are guided by the requirements of the case in hand, in particular by the reactivity of the thermally curable constituents, and can be selected and adjusted by the skilled worker in a simple way on the basis of his or her general art knowledge and his or her skilled ability.

Advantageously the cure takes place at a temperature of 20 to 90° C., preferably 40 up to a maximum of 60° C., for a time of 1 minute up to 10 hours, more preferably 20 minutes up to 5 hours.

By virtue of the curing at low temperatures, the coating compositions described are suitable in particular for the refinishing of automobile bodies, including the refinishing of original finishes on the line, and/or for the coating of plastics moldings or plastics parts for surface mounting for automobile bodies, particularly for bodies of automobiles of the top class, such as, for example, for producing roofs, tailgates, hoods, wings, fenders, spoilers, sills, protective strips, side trim elements, and the like. Alternatively they can be used for the OEM coating of bodies of means of transport (especially motor vehicles, such as motor cycles, buses, trucks or automobiles) or of parts thereof, or of components for shipbuilding and aircraft construction, and for automotive OEM finishing; for the coating of built structures, in the interior and exterior segments; of furniture, windows, and doors; of plastics moldings, especially CDs and windows; of small industrial parts, of coils, containers, and packaging; of white goods; of components for household and electrical appliances, of films; of optical, electrical and mechanical components; and also of hollow glassware and of articles of everyday use.

The coating compositions of the invention provide new cured coatings, especially refinishes, having a very good overall visual appearance. These resulting coatings are, in particular, free from surface defects and have a high transparency. In addition, the coating compositions of the invention are notable for rapid curing in the presence of moisture, and at the same time have a potlife of at least 30 minutes, more particularly of at least 2 hours. As a result of the at least proportional use of acrylate- and/or methacrylate-functional alkoxysilanes with ethoxy groups rather than methoxy groups for preparing the binders, moreover, it is possible to provide coating compositions which on curing release very little methanol and yet exhibit the requisite fast curing.

EXAMPLES

1. Preparation of the Binders A1 to A3 Containing Alkoxysilane Groups (Inventive) and of the Binder A4 (Comparative)

A double-walled 4 l stainless steel vessel which can be heated by means of an oil circulation thermostat and is equipped with a thermometer, anchor stirrer, 2 dropping funnels, and a reflux condenser is charged with the solvent for the polymerization as indicated in table 1 (initial charge). One of the dropping funnels is charged with the monomer mixture indicated in table 1, the second dropping funnel with the initiator solution indicated in table 1. The initial charge is heated to a polymerization temperature of 145° C. When the polymerization temperature is reached, the initiator feed is started first of all. 15 minutes after the beginning of the initiator feed, the monomer feed (duration: 240 minutes) is started. The initiator feed is set so as to continue for an additional 30 minutes after the end of the monomer feed. After the end of the initiator feed, the mixture is stirred at 145° C. for a further 2 hours.

TABLE 1

Components used for preparing the binders (A1) to (A4)

| Component | | Ex. 1 (A1) parts by wt. | Ex. 2 (A2) parts by wt. | Ex. 3 (A3) parts by wt. | Comp. ex. 1 (A4) parts by wt. |
|---|---|---|---|---|---|
| Initial charge | Solvent naphtha | 42.0 | 42.0 | 42.0 | 42.0 |
| Monomer mixture | n-Butyl acrylate | 15.0 | 15.0 | 15.0 | 15.0 |
| | n-Butyl methacrylate | 10.0 | 10.0 | 10.0 | 10.0 |
| | Methyl methacrylate | 20.0 | 20.0 | 20.0 | 20.0 |
| | Styrene | 25.0 | 25.0 | 25.0 | 25.0 |
| | Geniosil XL 36 [1] (methacryloyloxymethylenetriethoxysilane) | 30.0 | | | |
| | Geniosil XL 34 [2] ((methacryloyloxymethyl)methyldiethoxysilane) | | 30.0 | | |
| | Geniosil XL 33 [3] (methacryloyloxymethyltrimethoxysilane) | | | 30.0 | |
| | 3-Methacryloyloxypropyltriethoxysilane [4] | | | | 30 |

TABLE 1-continued

Components used for preparing the binders (A1) to (A4)

| | Component | Ex. 1 (A1) parts by wt. | Ex. 2 (A2) parts by wt. | Ex. 3 (A3) parts by wt. | Comp. ex. 1 (A4) parts by wt. |
|---|---|---|---|---|---|
| Initiator solution | Di-tert-butyl peroxide | 3.0 | 3.0 | 3.0 | 3.0 |
| | Solvent naphtha | 12.0 | 12.0 | 12.0 | 12.0 |

Key to table 1:
[1] Commercial methacryloyloxymethyltriethoxysilane from Wacker-Chemie AG
[2] Commercial (methacryloyloxymethyl)methyldiethoxysilane from Wacker-Chemie AG
[3] Commercial methacryloyloxymethyltrimethoxysilane from Wacker-Chemie AG
[4] Commercial product of Shin-Etsu Chemical Ltd. Japan

TABLE 2

Characteristics of the binders (A1) to (A4)

| | Example 1 | Example 2 | Example 3 | Comparative example C1 |
|---|---|---|---|---|
| Binder | (A1) | (A2) | (A3) | (A4) |
| Solids 1 h 130° C. | 65.6% | 66.1 | 66.6 | 65.4 |
| Acid number [mg KOH/g] | 0.9 | 1.2 | 0.8 | 0.4 |
| Viscosity ICI plate/cone [5] | 12.4 | 13.2 | 10.4 | 19.3 |
| $M_n$ [6] | 3874 daltons | 3449 daltons | 3041 daltons | 3977 daltons |
| $M_w$ [6] | 22568 daltons | 15567 daltons | 6945 daltons | 13650 daltons |

Key to table 2:
[5] Viscosity measured at 22° C. using the ICI plate/cone viscometer after the preparation of the binders at the solids content indicated in table 1 ("unadjusted viscosity")
[6] Measured by means of gel permeation chromatography (GPC) against a polymethyl methacrylate standard

2. Preparation of the Inventive Coating Compositions of Examples 1 to 3 and of the Coating Composition of Comparative Example C1, and Coatings Produced from them The coating compositions of inventive examples 1 to 3 and of comparative example C1 are prepared from the components indicated in table 3 by mixing. Thereafter the coating compositions thus obtained are drawn down directly onto 2 glass plates in each case, in a wet film thickness of approximately 100 µm, using a box-section coating bar. One glass plate is stored at room temperature; the other is flashed off for 15 minutes and then dried for 30 minutes at 60° C. in a forced air oven. The coatings are assessed in accordance with the following criteria:

Potlife:
An assessment is made of when the coating exhibits first gel particles.

Tack-Free State by Means of Zappon Tack Test (ZTT):
An aluminum strip with a thickness of about 0.5 mm, a width of 2.5 cm, and a length of about 11 cm is bent at a 110° angle so as to produce an area of 2.5×2.5 cm. The long side of the metal plate is bent over, after a further 2.5 cm, by about 15°, in such a way that the metal sheet is just held in balance by a weight of 5 g placed centrally on the square area. For the measurement of the tack-free state by the ZTT, the bent metal sheet is placed on the coating film and is loaded with a weight of 100 g for 30 seconds. Following removal of the weight, the coating is regarded as being tack-free if the metal sheet angle falls over within 5 seconds. The test is repeated at intervals of 15 minutes. Before the test is deployed, the tackiness of the coating film is assessed qualitatively by touching.

Pendulum Hardness:
The hardness of the coating films is determined by means of Koenig pendulum damping in accordance with DIN 53157. The figure reported is the number of pendulum swings.

TABLE 3

Composition of the coating compositions in parts by weight, and test results on the resulting coating

| Comp. | Ex. 1 | Ex. 2 | Ex. 3 | Comp. ex. C1 |
|---|---|---|---|---|
| Binder (A1) | 18.3 | | | |
| Binder (A2) | | 18.3 | | |
| Binder (A3) | | | 18.3 | |
| Binder (A4) | | | | 18.3 |
| Propanol | 1.0 | 1.0 | 1.0 | 1.0 |
| Butyl acetate | 0.3 | 0.3 | 0.3 | 0.3 |
| Nacure 4167 [1] | 0.36 | 0.36 | 0.36 | 0.36 |
| Potlife | >6 h | >5 h | 38 min | 2 h 30 min |
| (ZTT) RT [2] | 2 h 50 min | 4 h 50 min | 2 h 42 min | 4 h |
| (ZTT) 30' 60° C. [3] | 5 min | 5 min | 5 min | 5 min |
| Pend. hardness 1 day RT [4] | 47 | 40 | 54 | 27 |
| Pend. hardness 3 days RT [5] | 62 | 52 | 69 | 46 |
| Pend. hardness 7 days RT [6] | 107 | 57 | 86 | 52 |
| Pend. hardness 1 day drying 30' 60° C. [7] | 84 | 60 | 85 | 51 |
| Pend. hardness 3 days drying 30' 60° C. [8] | 113 | 66 | 100 | 64 |
| Pend. hardness 7 days drying 30' 60° C. [9] | 132 | 68 | 115 | 66 |

Key to table 3:
[1] Commercial catalyst from King Industries, based on an amine-blocked phosphoric acid partial ester, 25% strength in isopropanol
[2] Measurement of tack-free state with the Zappon Tack Test with the coating stored at room temperature
[3] Measurement of the tack-free state by the Zappon Tack Test with curing of the coating at 60° C. for 30 minutes and subsequent storage of the coating at room temperature
[4] Measurement of the pendulum hardness after storage of the coating for 1 day at room temperature
[5] Measurement of the pendulum hardness after storage of the coating for 3 days at room temperature
[6] Measurement of the pendulum hardness after storage of the coating for 7 days at room temperature
[7] Measurement of the pendulum hardness after curing of the coating at 60° C. for 30 minutes and subsequent storage of the coating for 1 day at room temperature
[8] Measurement of the pendulum hardness after curing of the coating at 60° C. for 30 minutes and subsequent storage of the coating for 3 days at room temperature
[9] Measurement of the pendulum hardness after curing of the coating at 60° C. for 30 minutes and subsequent storage of the coating for 7 days at room temperature Discussion of the Test Results:
The comparison of the examples shows clearly the influence of the monomers with alkoxysilyl groups that are used for preparing the binders. For instance, the comparison of example 1 with comparative example C1 shows that the alpha-silanes have a significantly higher reactivity than the comparable gamma-silanes. This is evident in particular in the attainment of the tack-free state (ZTT Test) and in the higher ultimate hardness after 7 days' storage.

In spite of this high reactivity on the part of the alpha-silanes, however, success is achieved in accordance with the invention in providing coating compositions having a sufficient potlife, as shown by inventive examples 1 to 3.

On the basis of the higher reactivity of the alpha-silanes, moreover, success is achieved in accordance with the invention in providing coating compositions which on curing do not give off toxicologically objectionable methanol but instead, as a result of the use of the alpha-ethoxysilanes, give off ethanol on curing. At the same time, in spite of the theoretically lower reactivity of the ethoxysilyl groups in comparison to methoxysilyl groups, these coating compositions based on alpha-ethoxysilanes display a surprisingly high reactivity and also, accordingly, effective curing at room temperature, as shown by inventive examples 1 and 2.

3. Preparation of the Inventive Coating Compositions of Examples 4 to 6 and of the Coating Compositions of Comparative Examples C2 to C7 and Coatings Produced from them The coating compositions of inventive examples 4 to 6 and of comparative examples C2 to C7 are prepared from the components indicated in table 4 by mixing. The catalyst solutions used are obtained as follows:

Preparation of Catalyst Salt K1: (Triethylamine-Blocked Bis-2-Ethylhexyl Phosphate)

A 100 ml three-neck flask with stirring magnet, internal thermometer, and dropping funnel is charged with 14.68 g of triethylamine, 13.75 g of methyl isobutyl ketone, and 27.32 g of ethyl acetate. With stirring and cooling, 44.25 g of bis-2-ethylhexyl phosphate are slowly added dropwise at a rate such that the temperature does not exceed 50° C. The mixture is held at 50° C. for a further 2 hours, then the process solvent is distilled off on a rotary evaporator and the residue is diluted with isopropanol to a solids content of 25%.

Preparation of Catalyst Salt K2: (DABCO-Blocked Bis-2-Ethylhexyl Phosphate)

A 100 ml three-neck flask with stirring magnet, internal thermometer, and dropping funnel is charged with 13.25 g of diazabicyclo[2.2.2]octane (DABCO), 16.9 g of methyl isobutyl ketone, and 33.59 g of ethyl acetate. With stirring and cooling, 36.26 g of bis-2-ethylhexyl phosphate are slowly added dropwise at a rate such that the temperature does not exceed 50° C. The mixture is held at 50° C. for a further 2 hours, then the process solvent is distilled off on a rotary evaporator and the residue is diluted with isopropanol to a solids content of 25%.

TABLE 4

Composition of the coating compositions in parts by weight, and test results on the resulting coating

| Comp. | Ex. 4 | Ex. 5 | Ex. 6 | Comp. ex. C2 | Comp. ex. C3 | Comp. ex. C4 | Comp. ex. C5 | Comp. ex. C6 | Comp. ex. C7 |
|---|---|---|---|---|---|---|---|---|---|
| Bdr (A1)[1] | 18.3 | 18.3 | 18.3 | 18.3 | 18.3 | 18.3 | 18.3 | 18.3 | 18.3 |
| Propanol | 1 | 0 | 1 | 1 | 1 | 1 | 1 | 1 | 1 |
| Butyl acetate | 0.3 | 0.3 | 0.3 | 0.3 | 0.3 | 0.3 | 0.3 | 0.3 | 0.3 |
| Cat. K1[2] | 0.36 | 0.36 | | | | | | | |
| Cat. K2[3] | | | 0.36 | | | | | | |
| DBTL[4] | | | | 0.36 | | | | | |
| Triethylamine | | | | | 0.09 | | | | |
| DABCO[5] | | | | | | 0.36 | | | |
| DBN[6] | | | | | | | 0.09 | | |
| DBU[7] | | | | | | | | 0.09 | |
| Phosphate[8] | | | | | | | | | 0.09 |
| Potlife | 4 h 4 min | 2 h 30 min | >7 h | 5 min | 4 h 12 min | 2 h 44 min | 3 min | 5 min | 2 h 47 min |
| (ZTT) | 2 h 52 min | >5 h | >6 h | >4 h | >4 h | >4 h | 120 min | 120 min | 180 |
| PH 1 day RT[9] | 103 | 46 | 28 | 49 | 10 | 65 | 66 | 62 | 83 |
| PH 7 days RT[10] | 126 | 122 | 75 | 75 | 13 | 114 | 100 | 101 | 101 |
| PH 1 day 30'60° C.[11] | 86 | 66 | 45 | 64 | 6 | 61 | 100 | 90 | 114 |
| PH 7 days 30'60° C.[12] | 100 | 103 | 81 | 78 | 15 | 111 | 111 | 110 | 125 |
| Appearance[13] | OK | OK | OK | OK | OK | h.[14] | st.[15] | st.[15] | st.[15] |

Key to Table 4:
[1] binder A1 described in table 1
[2] above-described 25% catalyst solution K1 of a triethylamine-blocked bis-2-ethylhexyl phosphate
[3] above-described 25% catalyst solution K2 of a DABCO-blocked bis-2-ethylhexyl phosphate
[4] DBTL = dibutyltin dilaurate
[5] DABCO = 1,4-diazabicyclo[2.2.2]octane
[6] DBN = 1,5-diazabicyclo[4.3.0]non-5-ene
[7] DBU = 1,8-diazabicyclo[5.4.0]undec-7-ene
[8] bis(2-ethylhexyl) phosphate
[9] Measurement of the pendulum hardness after storage of the coating at room temperature for 1 day
[10] Measurement of the pendulum hardness after storage of the coating at room temperature for 7 days
[11] Measurement of the pendulum hardness after curing of the coating at 60° C. for 30 minutes and subsequent storage of the coating at room temperature for 1 day
[12] Measurement of the pendulum hardness after curing of the coating at 60° C. for 30 minutes and subsequent storage of the coating at room temperature for 7 days
[13] visual assessment
[14] slight hazing visible, crystallization begins
[15] coatings show unwanted surface structures after curing Discussion of the Test Results:

The comparison of examples 4 and 6 and of comparative examples C2 to C7 clearly shows the influence of the catalysts used on the properties of the coating compositions and the coatings produced from them.

For instance, the inventive use of amine-blocked phosphoric acid partial esters in accordance with inventive examples 4 and 6 leads to coating compositions which exhibit effective curing in conjunction with a long potlife of more than 2 hours. Moreover, inventive coatings are obtained that have a high hardness and a very good overall visual appearance. The use of triethylamine-blocked phosphoric acid partial esters in accordance with inventive example 4 is preferred in comparison to the use of DABCO-blocked phosphoric acid partial esters in accordance with example 6, since it produces a significantly better curing and yet still a very good potlife.

The use of DBTL, which incidentally is also not very desirable, for reasons of toxicology, leads to coating compositions having a completely inadequate potlife, as shown by comparative example C2.

The use of various amines alone likewise leads to coating compositions and coatings having unacceptable properties.

For instance, the use of triethylamine in accordance with comparative example C3 leads to coating compositions which exhibit completely inadequate curing. Thus the pendulum hardness in comparative example C3, even on forced drying at 60° C. for 30 minutes and subsequent storage at room temperature for 7 days, is very much too low and suggests that, if it is possible to talk of curing at all, the curing that has taken place is only minimal, which is in no way acceptable.

The use of cyclic amines in accordance with comparative examples C4 to C6 as catalysts does lead to coating compositions which exhibit effective curing, but on the other hand the optical properties of the coating compositions and of the resulting coatings are unacceptable. For instance, the use of DABCO in accordance with comparative example C4 leads to hazy coating compositions, while both the use of DBN in accordance with comparative example C5 and the use of DBU in accordance with comparative example C6 lead to coatings having a pronounced surface structure. Moreover, the use of DBN and DBU as catalysts leads to coating compositions which exhibit a completely inadequate potlife.

Finally, the use of phosphoric acid partial esters without amine blocking leads to coating compositions which do exhibit effective curing and a good potlife, and yet, here as well, unacceptable coatings with a pronounced surface structure are obtained, as shown by comparative example C7.

4. Preparation of the Binders A5 and A6 Containing Alkoxysilane Groups (Inventive)

The binders A5 and A6 are prepared from the components indicated in table 5 in the same way as for the preparation of the binders A1 to A4, although, in the case of the preparation of binder A6, the polymerization temperature and the postpolymerization temperature is only 140° C., rather than 145° C. as for the preparation of the binders A1 to A5.

TABLE 5

Components used for preparing the binders A5 and A6

|  |  | Ex. 7 (A5) | Ex. 8 (A6) |
|---|---|---|---|
|  |  | Polymerization temperature | |
|  | Component | 145° C. parts by wt. | 140° C. parts by wt. |
| Initial charge | Solvent naphtha | 42.0 | — |
|  | 1-Methoxy-2-propyl acetate | — | 50.0 |
| Monomer mixture | n-Butyl acrylate | 15.0 | 20.0 |
|  | n-Butyl methacrylate | 10.0 | — |
|  | Methyl methacrylate | 20.0 | 20.0 |
|  | Isobornyl methacrylate | 15.0 | — |
|  | Cyclohexyl methacrylate | 10.0 | — |
|  | Hexanediol dimethacrylate | — | 10 |
|  | Styrene | — | 10.0 |
|  | Geniosil XL 36[1] (methacryloyloxymethylenetriethoxysilane) | 30.0 | 30.0 |
| Initiator solution | Di-tert-butyl peroxide | 3.0 | 8.0 |
|  | Solvent naphtha | 12.0 | — |
|  | 1-Methoxy-2-propyl acetate | — | 32.0 |

Key to table 5:
[1] Commercial methacryloyloxymethyltriethoxysilane from Wacker-Chemie AG

TABLE 6

Characteristics of the binders (A5) and (A6)

|  | Ex. 7 | Ex. 8 |
|---|---|---|
| Binder | (A5) | (A6) |
| Solids 1 h 130° C. | 65.4% | 60.86% |
| Viscosity ICI plate/cone [1] | 2.6 mPa·s | 2.2 mPa·s |
| $M_n$ [2] | 1709 daltons | 3112 daltons |
| $M_w$ [2] | 6860 daltons | 117690 daltons |

Key to table 6:
[1] viscosity measured at 23° C. using the ICI plate/cone viscometer after the preparation of the binders at the solids content indicated in table 5 ("unadjusted viscosity")
[2] measured by means of gel permeation chromatography (GPC) against a polymethyl methacrylate standard.

5. Preparation of the Inventive Coating Compositions of Examples 7 to 10, and Coatings Produced from them The coating compositions of inventive examples 7 to 10 are prepared from the components indicated in table 7 by mixing. Thereafter the coating compositions thus obtained are drawn down directly onto two glass plates in each case, in a wet film thickness of approximately 100 μm, using a four-way film applicator. One glass plate is stored at room temperature; the other is flashed off for 15 minutes and then dried for 30 minutes at 60° C. in a forced air oven. The coatings are assessed in accordance with the criteria stated for examples 1 to 6:

TABLE 7

Composition of the coating compositions in parts by weight, and test results of the resulting coating

| Component | Ex. 7 | Ex. 8 | Ex. 9 | Ex. 10 |
|---|---|---|---|---|
| Binder (A5) | 10.0 |  | 10.0 |  |
| Binder (A6) |  | 10.0 |  | 10.0 |
| Catalyst K2 [1] | 0.26 | 0.26 | 0.26 | 0.26 |
| Light stabilizer [2] | 0.22 | 0.22 |  |  |
| Flow control agent [3] | 0.02 | 0.02 |  |  |
| Flow control agent [4] | 0.05 | 0.05 | 0.05 | 0.05 |
| Butyl acetate | 0.15 | 0.15 | 0.15 | 0.15 |

TABLE 7-continued

Composition of the coating compositions in parts by
weight, and test results of the resulting coating

| Component | Ex. 7 | Ex. 8 | Ex. 9 | Ex. 10 |
|---|---|---|---|---|
| Propanol | 0.5 | 0.5 | 0.5 | 0.5 |
| Potlife (ZTT) RT [5] | >4 h / 120 min | 35 min / 120 min | >4 h / 120 min | 60 min / 120 min |
| Pend. hardness 1 day RT [6] | 82 | 54 | 54 | 46 |
| Pend. hardness 7 days RT [7] | 98 | 66 | 63 | 51 |
| Pend. hardness 1 day drying 30' 60° C. [8] | 75 | 51 | 58 | 54 |
| Pend. hardness 7 days drying 30' 60° C. [9] | 85 | 54 | 66 | 53 |

Key to table 7:
[1] above-described 25% strength catalyst solution K2 of a DABCO-blocked bis-2-ethylhexyl phosphate
[2] commercial light stabilizer based on 60 parts of a mixture of light stabilizers based on sterically hindered amines (HALS) and 40 parts of a UV absorber, 97% strength in 1-methoxy-2-propyl acetate
[3] commercial flow control agent based on a polyether-modified polydimethylsiloxane
[4] commercial flow control agent based on a polyacrylate copolymer, 52% strength in solvent naphtha
[5] measurement of the tack-free state by the Zappon Tack Test with the coating stored at room temperature
[6] measurement of the pendulum hardness after storage of the coating for 1 day at room temperature
[7] measurement of the pendulum hardness after storage of the coating for 7 days at room temperature
[8] measurement of the pendulum hardness after curing of the coating at 60° C. for 30 minutes and subsequent storage of the coating for 1 day at room temperature
[9] measurement of the pendulum hardness after curing of the coating at 60° C. for 30 minutes and subsequent storage of the coating for 7 days at room temperature

The invention claimed is:

1. A moisture-curing coating composition comprising aprotic solvents, and comprising (A) at least one binder having alkoxysilane groups and (B) at least one crosslinking catalyst, characterized in that said composition comprises as binder (A) at least one polyacrylate and/or polymethacrylate which is obtained by polymerizing one or more ethylenically unsaturated monomers (a1) of the formula (I)

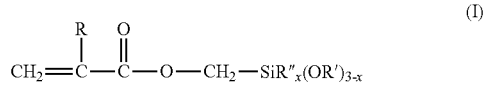

(I)

with

R=hydrogen or methyl radical,

R'=hydrogen, alkyl or cycloalkyl, and

R"=alkyl, cycloalkyl, aryl or aralkyl, the carbon chain thereof optionally being interrupted by nonadjacent oxygen groups, sulfur groups or groups NRa, with Ra=alkyl, cycloalkyl, aryl or aralkyl, and x=0 to 2, and further ethylenically unsaturated monomers consisting of ethylenically unsaturated monomers without active hydrogen and as crosslinking catalyst at least one phosphorous- and nitrogen-containing catalyst (B).

2. The coating composition as claimed in claim 1, wherein said composition comprises as binder (A) at least one polyacrylate and/or polymethacrylate which is obtained using one or more ethylenically unsaturated monomers of the formula (II)

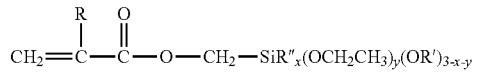

(II)

where R, R' and R" have the definition indicated for formula (I) and x=0 to 2, y=1 to 3, 1≤x+y≤3.

3. The coating composition as claimed in claim 2, wherein the ethylenically unsaturated monomer of the formula (II) is selected from the group consisting of alpha ethacryloyloxymethyldiethoxymethylsilane, alpha-methacryloyloxymethyltriethoxysilane, alpha-acryloyloxymethyldiethoxymethylsilane, alpha-acryloyloxymethyltriethoxysilane, and combinations thereof.

4. The coating composition as claimed in claim 1, wherein the binder (A) having alkoxysilane groups is obtained by polymerizing
(a1) 10% to 50% by weight of one or more ethylenically unsaturated monomers (a1) of the formula (I),
(a2) 15% to 85% by weight of one or more alkyl esters of ethylenically unsaturated carboxylic acids,
(a3) 0% to 50% by weight of one or more vinylaromatic compounds,
(a4) 0% to 20% by weight of one or more ethylenically unsaturated monomers having at least two polymerizable, ethylenically unsaturated double bonds, and
(a5) 0% to 40% by weight of one or more further ethylenically unsaturated compounds different from the monomers (a1) to (a4),
the sum of the weight fractions of the monomers (a1) to (a5) making 100% by weight in each case.

5. The coating composition as claimed in claim 1, wherein said composition contains 70.0% to 99.0% by weight, based in each case on the weight of the nonvolatile constituents of said composition, of at least one binder (A), and/or in that said composition contains 0.1% to 10.0% by weight, based in each case on the weight of the nonvolatile constituents of said composition, of at least one catalyst (B).

6. The coating composition as claimed in claim 1, wherein the catalyst (B) is selected from the group consisting of amine-blocked substituted phosphonic diesters, diphosphonic diesters, amine-blocked substituted phosphoric monoesters, amine-blocked substituted phosphoric diesters, amine-blocked substituted phosphoric triesters, and combinations thereof.

7. The coating composition as claimed in claim 1, wherein said composition comprises as catalyst (B) at least one substituted phosphonic diester and/or diphosphonic diester and/or phosphoric monoester and/or phosphoric diester which is blocked with a saturated tertiary amine.

8. The coating composition as claimed in claim 1, wherein said composition further comprises one or more aliphatic monoalcohols (C) which are different from the solvent.

9. The coating composition as claimed in claim 1, wherein said composition contains 0% to 20% by weight, based in each case on the weight of the nonvolatile constituents of said composition, of at least one aliphatic monoalcohol (C).

10. The coating composition as claimed in claim 1, wherein said composition is transparent.

11. A method of producing a multicoat finish, by applying to an unprecoated or precoated substrate a pigmented basecoat and thereafter a clearcoat wherein the clearcoat is a coat of the coating composition as claimed in claim 1.

12. The method as claimed in claim 11, wherein the multicoat finish is a refinish an automotive refinish, a utility-vehicle finish, or a finish on plastics moldings or plastics components for surface mounting.

13. The method as claimed in claim 11 wherein the substrate comprises one of interior and exterior bodywork components, components for shipbuilding and aircraft construction, components for household and electrical appliances, plastics moldings and films.

14. The coating composition as claimed in claim 1, wherein the binder (A) having alkoxysilane groups is obtained by polymerizing
- (a1) 15% to 40% by weight of one or more ethylenically unsaturated monomers (a1) of the formula (I),
- (a2) 25% to 60% by weight of one or more alkyl esters of ethylenically unsaturated carboxylic acids,
- (a3) 10% to 30% by weight of one or more vinylaromatic compounds,
- (a4) 0% to 10% by weight of one or more ethylenically unsaturated monomers having at least two polymerizable, ethylenically unsaturated double bonds, and
- (a5) 0% to 20% by weight of one or more further ethylenically unsaturated compounds different from the monomers (a1) to (a4),
- the sum of the weight fractions of the monomers (a1) to (a5) making 100% by weight in each case.

15. The coating composition as claimed in claim 1, wherein said composition contains 85.0% to 95.0% by weight, based in each case on the weight of the nonvolatile constituents of said composition, of at least one binder (A), and/or in that said composition contains 0.5% to 5.0% by weight, based in each case on the weight of the nonvolatile constituents of said composition, of at least one catalyst (B).

16. The coating composition as claimed in claim 1, wherein said composition comprises as catalyst (B) amine-blocked bis-2-ethylhexyl phosphate.

17. The coating composition as claimed in claim 16, wherein the blocking amine is selected from the group consisting of triethylamine, 1.4-diazabicyclo[2.2.2]octane, and combinations thereof.

18. The coating composition as claimed in claim 8, wherein the monoalcohols are primary monoalcohols having 2 to 4 carbon atoms.

19. The coating composition as claimed in claim 1, wherein said composition contain 0.5% to 10.0% by weight, based in each case on the weight of the nonvolatile constituents of said composition, of at least one aliphatic monoalcohol (C).

20. The coating composition as claimed in claim 2, wherein the binder (A) having alkoxysilane groups is obtained by polymerizing
- (a1) 10% to 50% by weight of one or more ethylenically unsaturated monomers (a1) of the formula (I) and/or of the formula (II),
- (a2) 15% to 85% by weight of one or more alkyl esters of ethylenically unsaturated carboxylic acids,
- (a3) 0% to 50% by weight of one or more vinylaromatic compounds,
- (a4) 0% to 20% by weight of one or more ethylenically unsaturated monomers having at least two polymerizable, ethylenically unsaturated double bonds, and
- (a5) 0% to 40% by weight of one or more further ethylenically unsaturated compounds different from the monomers (a1) to (a4),
- the sum of the weight fractions of the monomers (a1) to (a5) making 100% by weight in each case.

* * * * *